Aug. 5, 1952      A. F. PITYO ET AL      2,606,268
METHOD OF FORMING AND WELDING PINS TO METAL PARTS
Filed March 24, 1950      2 SHEETS—SHEET 1
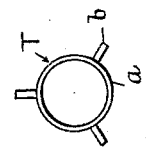
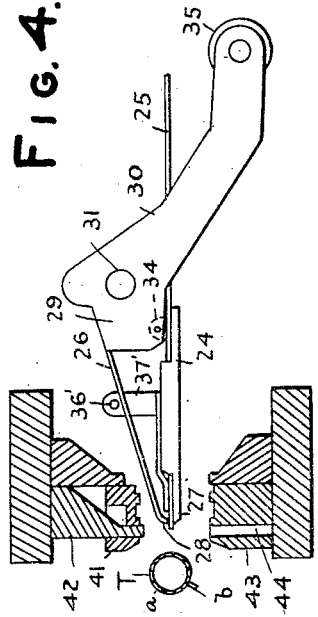
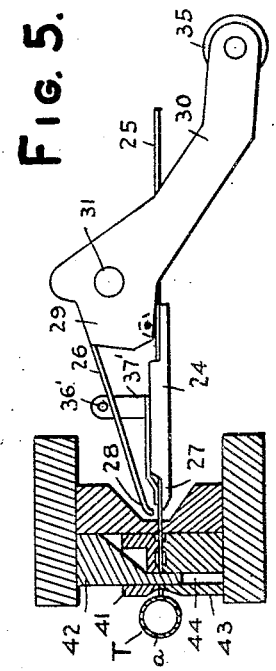
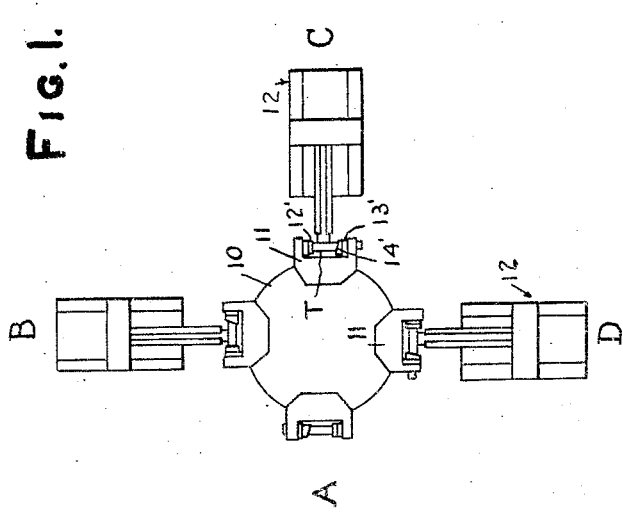
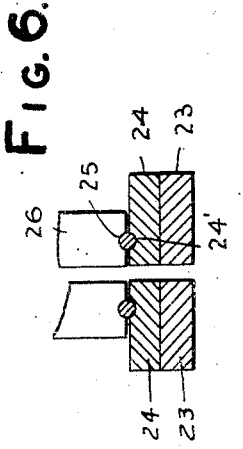
INVENTORS.
ALBERT F. PITYO
HARRY BUTTERFIELD
BY
ATTORNEY

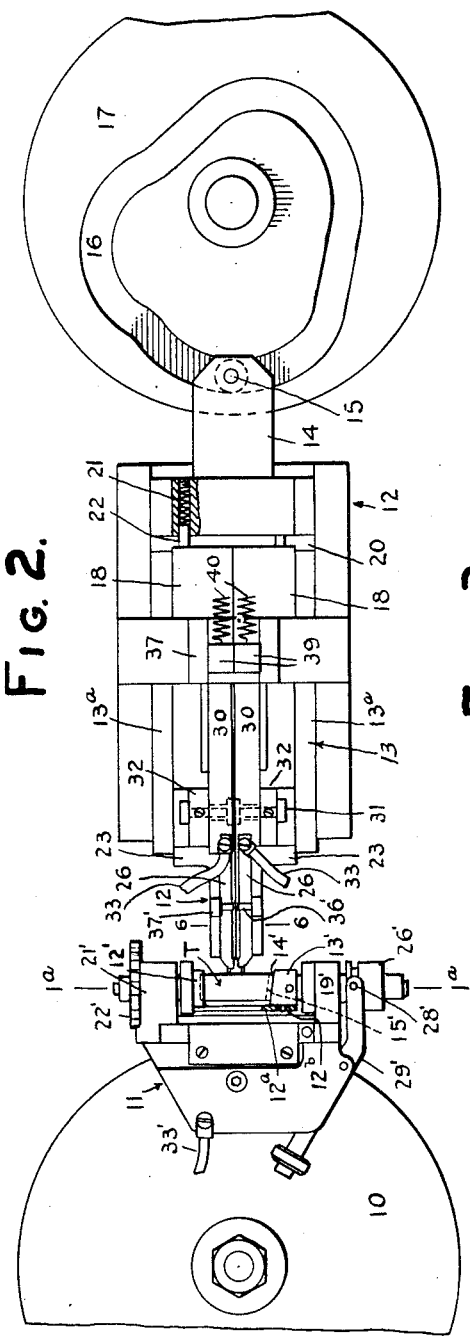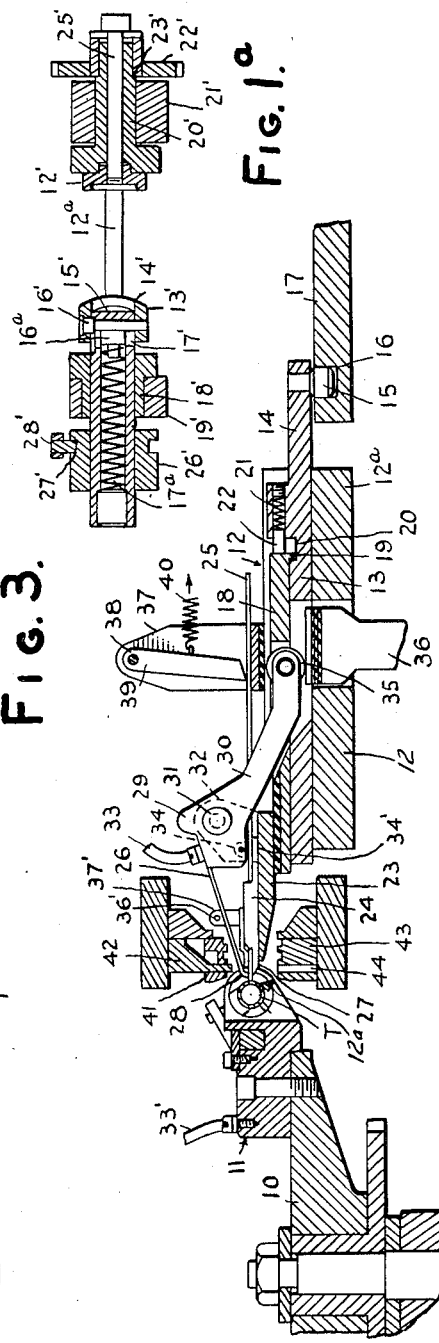

Patented Aug. 5, 1952

2,606,268

UNITED STATES PATENT OFFICE 2,606,268

METHOD OF FORMING AND WELDING PINS TO METAL PARTS

Albert F. Pityo, Clifton, and Harry Butterfield, Maplewood, N. J.

Application March 24, 1950, Serial No. 151,598

20 Claims. (Cl. 219—10)

This invention relates to a method of and apparatus for forming and welding studs or pins to tubular parts, such as gun components of cathode ray tubes and bayonet type lamp bases.

Important objects of the invention are to provide a method of welding multiple pins or studs, substantially simultaneously to a tubular part or tube, in longitudinal alignment, and to repeat the operation so that the longitudinal groups of pins are arranged in spaced relation circumferentially of the tube; a method which will weld the pins or studs to the exterior of the metal tube without an internal arbor, thus eliminating internal burns or raised metal portions; a method which will bring the supporting device including the electrodes close to the ends of the wires to obtain strong welds with the minimum discoloration and burning; to provide a method wherein the welding current is applied to the wires close to the free ends of the wires; a method to move the wire supporting device including the electrodes from the metal tube after the wires have been welded to the metal tube, so that the supporting device will be out of the way of the dies employed to sever the wires; a method wherein the wire supporting device including the electrodes is moved forwardly longitudinally of the wires which are now held against forward longitudinal movement, to a position one pitch from the tube so that the free ends of the wires extend for only a short distance beyond the supporting device; a method to clamp the wires to the wire supporting device when such device has been moved forwardly close to the free ends of the wires and the supporting device is at rest; a method wherein the supporting device with the wires clamped thereto, is moved forwardly toward the metal tube so that the free ends of the wires contact with the tube, and to exert a forward yielding pressure upon the supporting device during the welding period to permit the wires to follow through during such period.

In the accompanying drawings, forming a part of this application, and in which like numerals are employed to designate like parts throughout the same, Figure 1 is a diagrammatic plan view showing the indexing table, holders, and associated wire welding and severing devices, Figure 2 is a plan view of one of the wire welding and severing devices, the wire severing dies being omitted, Figure 3 is a central vertical longitudinal section through the wire welding and severing device, the severing dies being in the opened position and the welding jaws clamping the wires close to their free ends and holding the wires in contact with the metal tube, Figure 4 is a view similar to Figure 3, showing the severing dies opened and the welding jaws moved forwardly to clamp the wires close to their free ends, prior to the further forward movement of the welding jaws and wires, Figure 5 is a similar view, showing the dies in the closed position and the welding jaws moved rearwardly out of the path of travel of the dies, Figure 6 is a transverse section taken on line 6—6 of Figure 2.

Figure 7 is a side elevation of the product produced by the method,

Figure 8 is an end elevation of the same, and,

Figure 1$^a$ is a vertical section taken on line 1$^a$—1$^a$ of Figure 2.

In the drawings, the numeral 10 designates a horizontal rotatable table, carrying a suitable number of holders 11. The holders receive and hold the tubular metal parts or tubes T, which may be a gun component part of a cathode ray tube. This tubular metal part or tube is centered and held within the holder, without the use of an internal arbor. The tubular part or tube itself serves as one side of the electrode device. This is an important feature where clean welds are needed inside of the tubular part or tube. If the arbor is used, the tubular part or tube is frequently burned internally and raised metal parts are formed internally, unless a perfect fit is provided between the tubular part or tube and the arbor and a clean surface maintained between these parts at all times, which condition is difficult and costly to maintain. The table is indexed to bring each holder 11 and tubular part or tube T in succession to the stations A, B, C, and D. Each holding device includes jaws 12' and 13'. The jaw 12' has a slight annular recess to receive the end of the tubular part or tube T, while the jaws 13' has an end 14', which is inclined axially, to engage the inclined end of the tube T. The jaw 12' has a bar 12$^a$ rigidly secured thereto, and the opposite end of this bar is slotted to receive a pin 12$^b$ rigidly secured to the jaw 13'. The jaw 13' is slideably mounted upon a plunger 15', and the jaw 13' has a radial pin 16', extending through elongated slots 17', formed into the plunger 15'. The pin 16' is engaged by a plunger 16$^a$, slideable in the plunger 15' and moved toward the pin 16' by a spring 17$^a$. This spring holds the jaw 13' axially beyond the plunger 15', when pressure is removed from the jaw 13'. The plunger 15' is slideably mounted in a bushing 18' held within a bearing 19', rigidly mounted upon the table 10. The jaw 12' is mounted upon a rotatable sleeve 20', held within a bearing 21', rigidly mounted upon the table 10. The numeral 22 designates a star-wheel, the hub of which is mounted upon the outer end of the sleeve 20', engaging a shoulder 23'. The parts 12', 20' and 22' are clamped together to turn as a unit by a bolt 25'. The plunger 15' is retracted and projected by a hub 26', rigidly secured thereto, having an annular groove 27', receiving a pin 28', mounted upon a pivoted lever 29'.

When the holder is empty, the plunger 15' is in the outer or retracted position, and the jaw 13' is in the forward position and extends axially beyond the plunger 15'. The metal tube T has one end brought into engagement with the jaw 12' and its opposite inclined end into engagement with the inclined face of the jaw 13', and this shifts the jaw 13' to the retracted position so that the tube fits between and is held by the two jaws 12' and 13'. The plunger 15' is now projected forwardly by operating the lever 29' and the free end of this plunger now projects beyond the jaw 13' and enters the inclined end of the tube. The tube is now securely held in position between the jaws.

The jaws 12' and 13' turn as a unit, and these jaws may be turned upon their axes by means which indexes the star-wheel 22', or the turning of the jaws may be affected manually.

Any suitable means may be employed to index the table 10 or it may be indexed manually.

Upon the main slide 13 and guided thereby are two auxiliary slides 18, engaging the flanges 13ª. These two auxiliary slides are capable of having limited relative movement with respect to each other and with respect to the main slide. These auxiliary slides 18 have depending flanges 19, operating within a transverse groove 20, formed in the main slide 13. The auxiliary slides 18 are forced forwardly by compressible coil springs 21, bearing against the main slide 13 and plungers 22. The springs 21 hold the auxiliary slides in the forward position with respect to the main slide 13. Each auxiliary slide 18 has a separate forwardly projecting base 23 rigidly mounted thereon. Each base 23 has a lower electrode 24 rigidly mounted thereon and this metal electrode is provided with a longitudinal groove 24', to receive the metal wire 25. Adapted for co-action with each lower electrode 24 is an upper electrode 26. The electrodes 24 and 26 are formed of metal and have jaws 27 and 28 respectively. These jaws engage the wire to effect a proper contact therewith. Each upper electrode 26, which is resilient, is mounted upon the forward end 29 of a vertically swinging lever 30, pivoted upon a separate pin 31, carried by a knuckle 32, mounted upon each base 23. Each upper electrode 26 has connection with a wire 33 included in the welding circuit. A wire 33' is connected with the holder 11 and hence is an electrical connection with the tubular part or tube T. The forward end of each lever 30 has a clamping jaw 34, adapted to clamp the wire 25 against an anvil 34'. Each lever 30 has a roller 35 at its free end, which is engaged and raised by a head 36, which in turn is raised and lowered by cam means. Each electrode 26 has its upward movement limited by a horizontal pin 36', carried by an upstanding knuckle 37', secured to the base 23 of each slide 18.

Upstanding knuckles 37 are rigidly mounted upon the support 12, and carry a horizontal shaft 38, upon which are pivoted vertically swinging clamps 39, moved rearwardly by springs 40. These clamps have lower beveled ends to contact with the wires 25 and frictionally engage therewith to positively hold the wires against rearward feeding movement, and to hold them against improper forward feeding movement, but to permit of such proper forward feeding movement. The auxiliary slides 18 ordinarily move forwardly with the main slide 13, but are capable of partaking of limited longitudinal movement with respect to the main slide and each other. The upper and lower electrodes 24 and 26 and the wires are all thoroughly insulated from the frame of the machine, so that the welding circuit can be properly made.

Arranged between the holder 11 and the support or guide 12 are upper forming and severing dies 41 and 42, which are vertically movable. The forming die 41 co-acts with the lower die 43 having an opening 44 to receive the severing die. It is thus seen that these dies are adapted to be moved to a relative opened position. The bases 23 and the lower electrodes 24, constitute a horizontal support for the wires, and this support is movable radially toward and from the metallic part or tube. When the upper dies are raised and out of the way, this support is free to be moved toward the metallic part to bring the ends of the wire into contact with the side of the metallic part.

In the practice of the method, when the supporting device including the lower electrodes 24 is in the rear or retracted position, such device has slidable engagement with the wires 25, and is capable of moving longitudinally of the wires. The upper dies 41 and 42 are now in the closed or lowered position, and the supporting device is supporting the wires at a point remote from the free ends of the wires, Figure 5. The upper dies are now raised so that a passage is provided, for the supporting device which is now moved forwardly toward the metallic tube T, and slides upon the wires which are now held against forward movement by the clamps 39. This forward movement of the supporting device is effected by the forward movement of the main slide 13. When the slide 13 moves forwardly so that it reaches a distance of one pitch from the metal part or tube T, the slide 13 is brought to rest and the head 36 is moved upwardly, swinging the rear ends of the levers 30 upwardly, and causing the clamping jaws 34 to clamp the wires against the anvils 34'. When the main slide 13 moved forwardly, as stated, the auxiliary slides 18 moved forwardly with it as a unit. When the levers 30 had their rear ends swung upwardly, the upper electrodes 26 moved downwardly to firmly press the forward ends of the wires against the lower electrodes. With the parts in this adjusted position, as shown in Figure 4, the wires 25 project forwardly beyond the electrode jaws 27 and 28 for about $\frac{1}{16}$ of an inch. It is now seen that the supporting device including the lower electrodes has moved forwardly with respect to the wires and is now supporting the wires at the points spaced only a short distance from their free ends. After the wires are clamped to the supporting device, the main carriage 13 is again moved forwardly toward the metal tubular part or tube, carrying the supporting device with it. The ends of the wires 25 are now brought into contact with the side of the metal tubular part or tube T. The movement of the main slide 13 is slightly greater than is necessary to cause the ends of the wires to contact with the side of the tubular part T, but when the contact is made, the distance is compensated for by the compression of the springs 21. The main slide 13 moves forwardly a slightly greater distance than the auxiliary slides 18, placing the springs 21 under compression. When the welding occurs and the main slide 13 is stationary, the springs 21 apply a yielding force to the auxiliary slides 18 and wire supporting device, whereby such wire supporting device yieldingly presses the wires against the metal tube. While the ends of the wires 25 are thus yieldingly pressed against the metal part or tube T, the welding circuit is completed and the welding circuit is completed through the upper electrodes and the companion electrode including the holder 11 and tube T. The springs 21 under tension cause the wires to follow through during the welding period. When the welding period is completed, the head 36 is moved downwardly, and the rear ends of the levers 30 descend, so that the clamping jaws 34 release the wires from clamping engagement with the anvils 34'. The wire supporting device including the lower electrodes 24 is now moved from the tubular metal part T, and will slide along the wires 25 which are now attached to the tubular part T by the completion of the welding. When the wire supporting device is returned to the rear position out of the path of travel of the upper dies 31 and 42, such upper dies descend (and sever the wires at points spaced radially from the metallic tubular part T. This severing occurs at a point between the tubular part T and the retracted wire supporting device. The tube is then turned upon its longitudinal axis, while being indexed to the next station, to be described, for a suitable number of degrees, depending upon the number of stubs or pins to be welded to the tube in each annular set. Where three pins or stubs are to be included in each annular set, the metal tube T will be turned upon its longitudinal axis for 120°. The welding and severing steps are repeated at each station.

In view of the foregoing description, it will be be seen that I have provided a method for supporting the tubular part or tube without the use of an internal arbor and arranging wire or wires exteriorly of and near one side of the metal tube T. The wire or wires are slidably engaged by a supporting device which is movable longitudinally of the wires toward and from the metal tube T. The supporting device holds the wires substantially radial with respect to the metal tube T. When the supporting device is in the rear or retracted position, its forward end supports the wires at a point remote from the free ends of the wires. This is the condition which occurs when the supporting device must be retracted to be out of the way of the descending dies. When the descending dies are raised, the supporting device is moved forwardly toward the metal tube and slides over the wires which are now held against forward longitudinal movement by the clamps 39. When the supporting device moves forwardly so that the ends of the wires 25 project beyond the jaws 27 and 28 only for a short distance, the wires then are clamped to the supporting device, which is then brought to rest. While the wires are thus clamped to the supporting device, such device is again moved forwardly toward the metal tube T until the free ends of the wires are brought in contact with the side of the metal tube T. When this occurs, the forward movement of the supporting device is stopped, and the welding circuit is closed, and the yielding pressure from the springs 21 will cause the wires to follow through during the welding period. The welding circuit is opened at the end of the welding period and the wires are securely welded to the metal tube T, and the supporting device is now moved from the metal tube T and slides along the wires which are now attached to the metal tube T. When the supporting device has been moved rearwardly out of the path of travel of the upper dies, these dies may descend to sever the wires, and also form the wires. The metal tube T is now turned upon its longitudinal axis and the cycle of steps of the method repeated for forming and welding the succeeding pins or studs to the metal tube.

As indicated in Figure 1, the metal tube T is placed in the holder 11 at station A. The table 10 is now indexed to bring this holder to station B, and the welding and severing operation explained occurs at station B. The table 10 is indexed to bring the holder from station B to station C, and during this travel the metal tube is turned upon its longitudinal axis for 120° and brought to rest at station C. The second pair of pins is now applied to the metal tube T, by the welding and severing steps. After the completion of this operation, the table 10 is indexed to bring the holder 11 at station C to station D, and the metallic tube T is turned upon its longitudinal axis for 120° during this indexing and comes to rest at station D. The next set of pins is applied at station D, by the welding and severing steps. The table 10 is now indexed so that the holder 11 at station D is moved to station A, and the completed article removed and a new metallic tube T is inserted in the holder. A similar operation occurs with respect to each holder 11 in succession.

The metal tube T. Figures 7 and 8, comprising a cylindrical tubular body portion $a$, and the welding and severing steps secure the radial metal pins $b$ to the tubular body portion $a$. The pins $b$ are arranged in longitudinal groups, and the pins are spaced in each group from each other and from the ends of the tubular body portion $a$. Each longitudinal group of pins is in alignment with the central longitudinal axis of the tubular body portion $a$. The pins $b$ are arranged in transverse annular or circumferential groups, and the pins in each annular group are in alignment and equidistantly spaced. Each annular group is arranged in a radial plane disposed at right angles to the central longitudinal axis of the tubular body portion $a$. Where three pins are used in each annular group, the pins in the group are spaced 120° apart.

It is to be understood that the form of our invention herewith shown and described is to be taken as a preferred example of the same, and that various changes in the steps of the method, and various changes in the shape, size and arrangement of parts of the apparatus, may be resorted to without departing from the spirit of the invention or the scope of the subjoined claims.

Having thus described our invention, we claim:

1. The method of welding in succession substantially radial pins to the side of a metal tube, comprising supporting the metal tube and turning it intermittently upon its longitudinal axis for a part of a revolution and thereby providing rest periods for the tube, supporting a wire exteriorly of and upon one side of the tube and holding the wire substantially radially with respect to the tube, moving the wire longitudinally toward the tube when the tube is at each successive rest period so that the free end of the wire contacts with the tube, applying a welding current to the wire to weld the wire to the tube, and then severing the wire at a point spaced radially from the tube.

2. The method of welding in succession substantially radial pins to the side of a metal tube, comprising supporting the metal tube without a mandril therein, arranging a wire exteriorly of and upon one side of the tube and holding the wire substantially radial with respect to the tube, moving the wire longitudinally toward the tube so that its free end contacts with the tube, applying a welding current to the wire to weld the wire to the tube, then severing the wire at a point spaced radially from the tube, then turning the tube upon its longitudinal axis, and then repeating the same cycle of operation for applying the successive pin to the tube.

3. The method of welding substantially radial pins to the side of a metal tube, comprising supporting the metal tube, arranging a wire exteriorly of and near one side of the tube and holding the wire substantially radial with respect to the tube, moving the wire longitudinally toward the tube so that its free end contacts with the tube, applying a welding current to the wire to weld the wire to the tube, then severing the wire at a point spaced radially from the tube, and then turning the tube upon its longitudinal axis so that the cycle of operation may be repeated for welding the successive pin to the tube.

4. The method of welding pins to the side of a metal element, comprising supporting the metal element, arranging a wire exteriorally of and near one side of the metal element, applying a supporting force to the wire and arranging such supporting force at the maximum distance rearwardly from the free severed end of the wire and holding the wire generally radial with respect to the metal element, holding the wire against forward longitudinal movement toward the metal element while simultaneously moving the supporting force forwardly toward the metal element until the free end of the wire projects beyond the supporting force for only a short distance, continuing the forward movement of the supporting force toward the metal element and moving the wire forwardly with the supporting force so that the free end of the wire continues to project a short distance beyond the supporting force and such free end is brought into contact with the side of the metal element, applying a welding current to the wire substantially at its free end to weld the wire to the metal element, moving the supporting force rearwardly from the metal element after the wire is welded to the metal element so that the supporting force is returned to the maximum distance from the metal element and then severing the wire between the metal element and the supporting force so that such supporting force is again arranged at the maximum distance rearwardly from the free severed end of the wire.

5. The method of welding pins to a metal element, comprising supporting the metal element, arranging a supporting device at a remote position with respect to the metal element, arranging a wire in slidable contact with the supporting device and positioning the leading end of the wire the maximum distance from the metal element and the leading end of the supporting device, holding the wire against longitudinal movement toward the metal element and simultaneously moving the supporting device forwardly toward the metal element and longitudinally with relation to the stationary wire, clamping the wire to the supporting device when the supporting device has moved forwardly toward the metal element so that the wire projects forwardly beyond the supporting device for a short distance only, continuing the forward movement of the supporting device toward the metal element while the wire is clamped to the supporting device to bring the free end of the wire into contact with the metal element, applying a welding current to the wire adjacent to the forward end of the supporting device, releasing the clamping engagement between the wire and the supporting device and moving the supporting device rearwardly from the metal element after the metal element is welded to the wire so that the supporting device is returned to the remote position, then severing the wire between the supporting device and the metal element at the maximum distance from the leading end of the supporting device.

6. The method of welding radial pins to the side of a metal tube, comprising supporting the metal tube and indexing it to a welding position, supporting a wire exteriorly of and near one side of the metal tube and holding it substantially radial with respect to the tube, moving the wire longitudinally toward the tube to bring its free end into contact with the tube, applying a welding current to the wire to weld the same to the tube, severing the wire at a point spaced radially from the tube, and then turning the tube upon its longitudinal axis so that the successive wire may be welded thereto.

7. Apparatus for welding a pin to a metal element, comprising means for supporting the metal element, severing dies arranged near and spaced from the metal element and adapted to have opened and closed positions, a support arranged near the dies, a supporting device mounted upon the support and moveable toward and from the metal element and between the dies when the dies are in the opened, position, said supporting device having slidable engagement with the wire when such wire has its free end at the maximum distance from the supporting device, means engaging the wire for holding it against longitudinal movement toward the metal element when the supporting device is moved toward the metal element, means to clamp the wire to the supporting device after the supporting device has been moved toward the metal element a sufficient distance so that the wire projects only for a short distance beyond the supporting device, said clamping means when active overcoming the action of the holding means, means for supplying a welding current to the wire at the forward end thereof which projects a short distance beyond the supporting device.

8. Apparatus for welding substantially radial pins to the side of a metal element, comprising means engaging the element to support it, severing dies arranged near one side of the element and adapted to have relative opened and closed positions, a support arranged upon the side of the dies remote from the element, a main reciprocatory slide mounted upon the support, auxiliary slides mounted upon the main slide and having a limited relative reciprocatory movement with relation thereto, springs arranged between the main slide and auxiliary slides, supporting devices mounted upon the auxiliary slides and guided thereby so that the supporting devices are movable substantially toward and from the element and between the dies when the dies are in the relative opened position, the supporting devices slidably engaging wires and movable longitudinally of the wires, means engaging the wires for holding them against longitudinal movement toward the element when the supporting devices are moved toward the element, means to clamp the wires to the supporting devices after the supporting devices have been moved toward the tube a sufficient distance so that the wires project only for a short distance beyond the supporting device, the clamping means when active overcoming the action of the holding means, and means for supplying a welding current to the wires and means to render the clamping means active and inactive.

9. The method of securing a plurality of groups of metal pins to a metal tube, comprising supporting the metal tube, supporting a longitudinal group of wires exteriorly of and near the side of the tube in a position radially of the tube and in alignment with the central longitudinal axis of the tube, substantially simultaneously feeding the wires in the longitudinal group forwardly toward the tube while holding them against lateral displacement to maintain the fixed relative position with respect to the tube and to bring the ends of the wires into contact with the side of the tube, welding the wires to the tube, severing the wires to separate the attached pins, intermittently turning the tube upon its longitudinal axis for a plurality of steps, and repeating the identical wire handling method at the end of each step so that a plurality of groups of pins is secured to the side of the tube and the pins of different groups are arranged in circumferential alignment.

10. The method of securing metal pins to a metal tube, comprising supporting the metal tube and indexing the same to successive stations, turning the tube upon its longitundinal axis when indexed from one station to the next station, and forming and welding metal pins to the exterior of the metal tube at the successive stations.

11. The method of securing a plurality of metal pins to a metal tube, comprising supporting the metal tube and indexing the same to successive stations, turning the tube upon its longitudinal axis when indexed from one station to the next station, forming and welding metal pins to the exterior of the metal tube at the successive stations, and arranging the pins in longitudinal and circumferential groups and spacing the pins in the longitudinal groups and in the circumferential groups.

12. The method of securing a pluraltiy of metal pins to a metal tube, comprising supporting the metal tube and indexing the same in succession to stations. supporting a group of wires at each station and arranging the group radially of the metal tube and longitudinally of the same, feeding the wires in the group forwardly at each station to bring the leading ends of the wires in contact with the outer face of the metal tube, welding such contacting ends with the metal tube, severing the wires at points spaced from the contacting ends.

13. Apparatus for welding pins to a metal element comprising, means for supporting the metal element, a support arranged near the supporting means, a reciprocatory supporting device mounted upon the support and movable toward and from the metal element, said supporting device having a wire contacting therewith, the supporting device being movable longitudinally of and in relation to the wire, an electrode which is out of engagement with the wire when the wire has slidable engagement with the supporting device, means to move the electrode into engagement with the wire at a point close to the leading end of the wire and to clamp the wire to the supporting device, and means to sever the wire.

14. Apparatus for welding a pin to a metal element comprising, means for supporting the metal element, a support arranged near the supporting means, a reciprocatory supporting device mounted upon the support and movable toward and from the metal element, an electrode mounted upon the supporting device and arranged to engage with the wire at a point close to the leading end of the wire.

15. Apparatus for welding a pin to a metal element, comprising means for supporting the metal element, a support arranged near the supporting means, a reciprocatory supporting device mounted upon the support and movable toward and from the metal element, said supporting device having a wire slidably contacting therewith, the supporting device being movable longitudinally of and in relation to the wire, an automatic clamp to engage the wire for exerting a selected pressure upon the wire for holding it against forward movement toward the metallic element and to prevent the rearward longitudinal movement of the wire, a movable element mounted upon the supporting device and having means to clamp the wire to the supporting device, such clamping means overcoming the holding action of the clamp with respect to the forward movement of the wire, an electrode mounted upon the movable element and out of engagement with the wire when the movable element is in the inactive position and moved into engagement with the wire close to its free end when the movable element is shifted to the active position, and means to move the movable element.

16. The method of welding metal elements to the exterior of a metal tube, comprising supporting the metal tube at its ends without a mandrill therein, turning the metal tube intermittently upon its longitudinal axis to bring portions of metal tube to a fixed position with respect to such longitudinal axis and providing a dwell when each portion is moved to the fixed position, supporting metal elements exteriorly of the metal tube and moving a metal element into contact with the tube at a point spaced from the ends of the tube and during each dwell, and applying a welding current to each contacting metal element and tube by connecting a welding circuit with the metal part and one end of the tube.

17. The method of welding a metal element to a metal tube, comprising supporting the metal tube at its ends without a mandril therein, supporting the metal element exteriorly of the metal tube and moving the free end of the metal element into contact with the tube at a point spaced considerable distances from the ends of the tube, and applying a welding current to the contacting metal element and tube by connecting a welding circuit to the contacting metal element in close relation to its free end and with one end of the metal tube.

18. The method of securing wire elements to an elongated metal part having a side and a longitudinal axis, comprising supporting such metal part and indexing the same to successive stations, turning the metal part upon its longitudinal axis when indexed from one station to the next station, moving the wire elements into contact with the exterior of the side of said metal part at the successive stations, and supplying a welding current to the wire elements to weld them to said metal part.

19. The method of welding, comprising supporting an elongated metal part having a side and a longitudinal axis, turning such metal part intermittently upon its longitudinal axis for a part of a revolution and thereby providing rest periods and bringing portions of said side to attaching positions, supporting a wire element transversely and exteriorly of and near each side portion at the attaching position, moving the wire element longitudinally toward such side portion so that the end of the wire element contacts with said side portion, and applying a welding current to the wire element to weld the same to the side portion.

20. A welding apparatus comprising, a rotatable table, a plurality of devices arranged upon the table and circumferentially spaced thereon and indexed to stations by said table, each device including means for holding an elongated metal tube having a side and longitudinal axis, means for turning the metal tube upon its longitudinal axis when indexed from one station to the next station, means arranged at each station for supporting a wire element exteriorly of the metal tube, means to shift the wire element longitudinally at each station toward the metal tube to bring the end of the wire element into contact with the side of the metal tube, and means for applying a welding current to the wire element to weld the same to the metal tube.

ALBERT F. PITYO.
HARRY BUTTERFIELD.

REFERENCES CITED

The following references are of record in the file of this patent:

UNITED STATES PATENTS

| Number | Name | Date |
|---|---|---|
| 1,929,444 | Murray et al. | Oct. 10, 1933 |
| 2,103,206 | Ober | Dec. 21, 1937 |
| 2,220,579 | Murray | Nov. 5, 1940 |
| 2,316,597 | Kershaw | Apr. 13, 1943 |
| 2,337,294 | Cooper | Dec. 21, 1943 |
| 2,339,884 | Schlumpf | Jan. 25, 1944 |